United States Patent Office 3,498,932
Patented Mar. 3, 1970

4,498,932
TERPOLYMERS OF A C-SUBSTITUTED AZIRIDINE, AN N-SUBSTITUTED AZIRIDINE, AND AN ORGANIC DIHALIDE
Henry J. Dishburger and William P. Coker, Lake Jackson, Tex., assignors to The Dow Chemical Company, Midland, Mich., a corporation of Delaware
No Drawing. Filed Mar. 24, 1966, Ser. No. 537,009
Int. Cl. C08g 33/08
U.S. Cl. 260—2
3 Claims

ABSTRACT OF THE DISCLOSURE

Novel terpolymers comprising reaction products of a C-substituted aziridine, a N-substituted aziridine and an organic dihalide are excellent flocculating agents. The novel terpolymers are prepared from the above-mentioned monomers in the presence of an inert solvent.

---

This invention relates to polymeric compositions of ethylenimine and its derivatives and to a process for preparing them. More particularly, the invention relates to novel terpolymers produced by the polymerization of an aziridynyl compound with an N-substituted aziridine and an organic dihalide. The terpolymers of this invention are particularly useful as flocculating agents.

For the purposes of this invention, the term "C-substituted aziridine" refers to compounds of the form

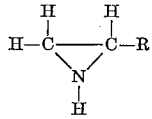

wherein R is hydrogen or an alkyl group containing from 1 to 4 carbon atoms. The term "ethylenimine" (hereinafter EI) refers to the above compound wherein R is hydrogen. The term "N-substituted aziridine" refers to compounds having the general formula

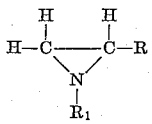

wherein R is hydrogen or an alkyl group containing from 1 to 4 carbon atoms, and $R_1$ is an alkyl, allyl, hydroxy-alkyl, cyano-substituted alkyl, aralkyl, cycloalkyl group, or an ester-substituted ethyl group containing from 1 to about 8 carbon atoms.

It is known to prepare polymers of ethylenimine and other aziridinyl compounds by reacting them in the presence of an organic dihalide polymerization initiator. This process is disclosed, for example, in Wilson, U.S. Patent 3,203,910, issued Aug. 31, 1965. Polymers of some N-substituted aziridines are also known. Bestian, U.S. Patent 2,626,931, issued Jan. 27, 1953, discloses polymers of certain N-substituted aziridines which are prepared by means of neutral sulfuric and sulfonic esters as catalysts.

It has now been discovered that novel water-soluble terpolymer compositions can be obtained by polymerizing a C-substituted aziridine or EI and an N-substituted aziridine, utilizing an organic dihalide both as a catalyst and as a crosslinking compound. The polymer compositions are produced by combining a C-substituted aziridine or EI and an N-substituted aziridine in the presence of at least a catalytic amount of an organic dihalide in an inert solvent, and allowing the polymerization to take place. For the purposes of this invention, the term "catalytic amount" may be defined as a sufficient amount of the catalyst to produce polymerization under the conditions hereinafter defined. The polymerization according to the process of this invention may be carried out from about room temperature, i.e., 15° C., to about 100° C., and higher if a closed reactor is used.

While the mechanism of the polymerization is not fully understood, it is believed that the organic dihalide compound acts to promote the polymerization of a C-substituted aziridine or EI with an N-substituted aziridine by protonating the aziridine rings. Thus, the aziridine rings are opened and joined across the nitrogen atoms. When the organic dihalide compound acts as a crosslinking compound, it is believed that the halogen atoms are stripped therefrom and the organic radical joins two nitrogen atoms. It is believed that both functions of the organic dihalide compound are carried out simultaneously.

The resulting terpolymer is believed to have a random formula incorporationg the following recurring groups:

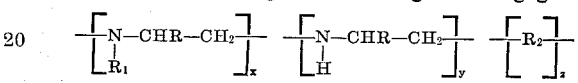

wherein R is independently in each case, hydrogen or an alkyl group having from 1 to 4 carbon atoms. $R_1$ is an alkyl, allyl, hydroxy-alkyl, cyano-substituted alkyl, aralkyl, cycloalkyl group, or ester-substituted ethyl group containing from 1 to about 8 carbon atoms, and $R_2$ is an alkylene group containing from 2 to 4 carbon atoms or a 2-butenylene group. The ratio of $x$ to $y$ may vary from about 1:1 to about 1:9; $z$ varies from about .003 to about .08 times the sum of $x+y$.

Branching occurs through the reaction of —NH— groups with aziridine rings. Quaternized nitrogens are also formed to some extent. There is apparently a wide spread in molecular weights. The average molecular weight cannot be determined accurately because gels are present. It is not known how the polymer chain terminates.

Terpolymers prepared according to the process of this invention have a viscosity between about 10 centipoises in a 10 weight percent water solution at 25° C. and about 20 centipoises in a 1 weight percent water solution at 25° C.

C-substituted aziridines having the general formula defined previously and EI are suitable for the practice of this invention. The preferred compounds are ethylenimine and propylenimine.

A general definition of the N-substituted aziridines which are suitable reactants for the practice of the present invention has also been given above. Examples of such N-substituted aziridines include 1-phenethylaziridine, ethyl 2-(1-aziridinyl)ethylcarbamate, 2 - (1 - aziridinyl) ethylacetate, 1 - (2 - hydroxyethyl)aziridine, 1-butylaziridine, and 1-allylaziridine. Others include 1-ethylaziridine, 1-(2-hydroxypropyl)aziridine, and the like.

Such N-substituted aziridines may be prepared by a variety of methods known in the art. Typical of these methods are the following:

(1) The addition of alkylene oxides to aziridinyl compounds;

(2) The reaction of alkyl halides with aziridinyl compounds, wherein the aziridine ring substitutes for the halide;

(3) The addition of an aziridinyl compound across active double bonds, e.g., ethylenimine and acrylonitrile.

These and other methods for preparing N-substituted aziridines useful for the preparation of the terpolymers of this invention are reviewed by H. Bestian, Annalen, 566, 210–244 (1950).

As used herein, the term "ester-substituted ethyl group" refers to a group wherein an ester is attached to an aziridine ring through two carbon atoms, e.g.,

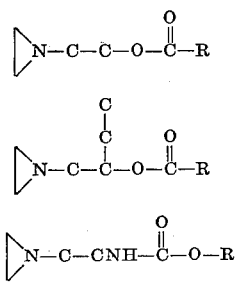

wherein R is an alkyl group having from 1 to 4 carbon atoms. Thus, the ester is always separated from the aziridine ring by two carbon atoms and the total group so substituted on the aziridine ring contains up to about 8 carbon atoms.

The organic dihalide polymerization promoters and crosslinking compounds are of the form $X-R_2-X$, wherein $R_2$ is an alkylene group containing from 2 to 4 carbon atoms or a 2-butenylene group, and X is chlorine, bromine, or iodine. Preferable are the organic dihalides wherein $R_2$ is ethylene or 2-butenylene, and X is chlorine or bromine. Examples of suitable organic dihalide compounds include: ethylene dichloride, ethylene dibromide, ethylene diiodide, 1,4-dichlorobutene-2, 1,3-dichloropropane, 1,3-dibromopropane, 1,4 - dichlorobutane, 1,4-dibromobutane, 1-chloro-3-bromopropane, and the like. Substitution of other organic dihalide compounds will be obvious to those skilled in the art, having the benefit of the above.

The process of the present invention may be carried out in any inert, polar solvent. The term "inert" means that the solvent must be non-reactive with the reagents used under the reaction conditions specified herein. The term "polar" means that the solvent should have a dielectric constant high enough to promote solvolysis sufficient to allow protonation of the aziridine ring. While it is difficult to ascribe a minimum numerical value to this characteristic, the solvent generally should have a dielectric constant of at least about 15 at 20° C. Any of the known polar solvents, except those containing active hydrogen, are suitable for the practice of this invention. Examples of such suitable solvents include water; alcohols, such as methanol, ethanol, isopropanol, and butanol; acetonitrile; glycols, such as ethylene glycol and propylene glycol; and the like. Preferred solvents are water, the lower alcohols, and mixtures thereof.

In practice, the polymerization reaction is carried out from about 15° C. to about 100° C. The polymerization is slow at room temperature; temperatures of about 25° C. to 100° C. are preferable. Best results are obtained at a temperature of about 70° C. to 90° C. Higher temperatures may be employed in a closed reactor.

The polymerization time is dependent upon the individual N-substituted aziridines, the temperature, the ratio of C-substituted aziridine or EI and N-substituted aziridine, and the concentration of the reactants. Rather long polymerization times, up to about 12 hours, are employed, with the addition of the organic dihalide in increments, in order to achieve a high molecular weight or viscous polymer solution without gelling. Reaction times from about 1 to about 12 hours are preferred. Generally speaking, reaction times of less than one hour do not give a terpolymer possessing the flocculating properties described herein to a sufficient extent. Reaction times of greater than 12 hours tend to produce gelling and insolubility.

The ratio of the organic dihalide compound to the C-substituted aziridine or EI and N-substituted aziridine varies depending upon the ratio and type of N-substituted aziridine employed in the polymerization mixture. Generally, from about .003 to about .08 mole of the organic dihalide compound is used per mole of the C-substituted aziridine or EI and N-substituted aziridine. Usually, at least .003 mole ratio is needed to promote polymerization, while more than .08 mole ratio causes excess crosslinking and tends to produce an insoluble product.

Once the amount of the organic dihalide compound needed to yield the desired terpolymer is determined, the polymerization may be speeded up by adding the desired quantity initially or progressively or a portion initially and the remainder shortly thereafter.

Gel formation may be prevented by adding the organic dihalide compound in increments and controlling the copolymerization time carefully or by using solution agitating means, such as a gear pump, during the polymerization. The polymerization may be carried out in the normal manner until the solution becomes very thick. The mechanical agitating means is then started, and the solution is agitated continuously during the later stages of polymerization. This allows crosslinking to a greater degree while maintaining the ability to dilute the polymer system and obtain a clear solution. If moderate gelling does occur, the gels can be put back into solution by merely diluting with the solvent and mixing. If gelling goes too far, the result is an insoluble polymer that cannot be redissolved by mechanical agitation or dilution.

The ratio of N-substituted aziridine to C-substituted aziridine or EI is not critical. The ratio that may be used for the production of soluble polymers will depend on the nature of the R— group substituted on the N. One could use a substantially larger amount of 1-(2-hydroxyethyl)aziridine than 1-phenethylaziridine and still retain solubility in the solvent. The 1 to 4 ratio by weight of 1-phenethylaziridine to ethylenimine in Example 1 approaches the upper limit for solubility in water with this particular composition. In general, from about 1 to 9 parts by weight C-substituted aziridine or EI per part by weight of the N-substituted aziridine is used, depending on the nature of the N-substituted aziridine and the solvent used.

The ratio of reactants to the amount of solvent used may be varied up to about 33 percent by weight of the reactants. Generally, about 25 weight percent reactants is preferred. This may be varied, but a higher concentration of reactants tends to reduce the maximum molecular weight that may be obtained for the polymers and retain solubility. More branching occurs at higher concentrations.

The polymerizations are advantageously carried out at atmospheric pressure. Increased pressures would not be detrimental.

Water is advantageously employed as the solvent because a water solution is desired for flocculation studies. However, other solvents as described herein may be employed. The polymeric materials are not isolated from their aqueous solutions when the uses require aqueous solutions.

The aqueous solutions are translucent to opaque and are viscous. They normally are colorless to faintly milky in appearance. The N-(2-hydroxyethyl)aziridine-ethylenimine polymeric material is light to dark yellow. Terpolymers prepared according to this invention are primarily useful as flocculating agents.

The following examples describe completely representative specific embodiments and the best mode contemplated by the inventors of carrying out the invention. While they are explained in detail, the scope of this invention is limited only by the scope of the claims appended hereto.

EXAMPLE 1

Ethylenimine—1-phenethylaziridine—ethylene dichloride terpolymer

Into a one-liter reaction flask fitted with a thermometer, stirrer, addition funnel, and reflux condenser system is placed 300 g. of water and 3 g. of ethylene dichloride. The water-ethylene dichloride mixture is heated with stirring to 85° C. A mixture of 80 g. of EI and 20 g.

of 1-phenethylaziridine is added dropwise at a rate sufficient to maintain the temperature in the range of 85° to 90° C. The time of addition is 30 minutes and the temperature is controlled at 85° to 90° C. during the remainder of the polymerization. A quantity of 3 g. additional ethylene dichloride is added in 1 g. increments during the course of polymerization. A polymerization time of 5 hours and 20 minutes results in a viscous aqueous polymer solution. Completion of the polymerization reaction is shown by termination of the exotherm. The polymer solution is cooled to room temperature. The resulting product is translucent to opaque and has a viscosity in a one weight percent water solution at 25° C. of 19 centipoises as measured by a Brookfield viscometer.

EXAMPLE 2

Ethylenimine—ethyl 2-(1-aziridinyl)ethylcarbamate—ethylene dichloride terpolymer A quantity of 147 g. of water and 1 g. of ethylene dichloride is placed in a flask fitted as in Example 1. The mixture is stirred and heated to 70° C. Heating is discontinued and 45 g. of ethylenimine and 5 g. of ethyl 2-(1-aziridinyl)ethylcarbamate are added as a mixture dropwise at a rate sufficient to maintain a solution temperature of 70° to 75° C. The time of addition is 10 minutes. The temperature is maintained from 70° to 75° C. during the remainder of the polymerization. Additional one gram increments of ethylene dichloride are added after 100 and 210 minutes of polymerization. A total polymerization time of 5 hours yields a moderately viscous polymer solution. The product solution is translucent and has a viscosity in a 10 percent by weight aqueous solution of 12 centipoises at 25° C.

EXAMPLE 3

Ethylenimine—2-(1-aziridinyl)ethyl acetate—ethylene dibromide terpolymer

In the same manner as Examples 1 and 2, mixture of 42.5 g. of EI and 7.5 g. of 2-(1-aziridinyl)ethyl acetate is added to a mixture of 147 g. of water and 1 g. of ethylene dibromide which has been preheated to 71° C. The time of addition is 25 minutes. Polymerization is allowed to continue for 6 hours with addition of 1.5 g. of ethylene dibromide in 0.5 g. increments. The polymer solution is then diluted to twice its weight with water and reheated for 5 hours with the addition of 1.5 g. more of ethylene dibromide in 0.5 g. increments. The resulting translucent aqueous polymer solution has a viscosity in a one weight percent solution of 17.2 centipoises at 25° C.

EXAMPLE 4

Ethylenimine—1-(2-hydroxyethyl)aziridine—1,4-dichlorobutene-2 terpolymer

As above, a mixture of 30 g. of EI and 20 g. of 1-(2-hydroxyethyl)aziridine is added dropwise to a previously heated mixture of 147 g. water and 1 g. of 1,4-dichlorobutene-2. The time of addition is 22 minutes and the solution temperature is maintained at 30° C. for the polymerization, which is continued for 10 hours. The resulting light to dark yellow viscous liquid has a viscosity of 8.5 centiposes at 25° C. in a one percent by weight aqueous solution.

EXAMPLE 5

Ethylenimine—1-n-butylaziridine—ethylene dichloride terpolymer

As described in Example 2, 147 g. of water, 4.5 g. of ethylene dichloride, 42.5 g. of ethylenimine, and 7.5 g. of 1-n-butylaziridine are polymerized over a 7 hour period with constant stirring at a temperature between 70° and 75° C. 1.5 g. of the ethylene dichloride is used initially with an additional 3 g. added in 0.5 g. increments during the course of polymerization. The resulting polymer solution is opaque and has a viscosity of 12.5 centipoises at 25° C. in a one percent by weight aqueous solution.

EXAMPLE 6

Ethylenimine — 1-allylaziridine — ethylene dichloride terpolymer

As above, 147 g. of water, 3.5 g. of ethylene dichloride, 40 g. EI, and 10 g. of 1-allylaziridine are polymerized over an 11 hour period at 70°–75° C. with constant stirring. A quantity of 1 g. of the ethylene dichloride is added initially, followed by 5 increments of 0.5 g. at various times throughout the course of polymerization. The resulting polymer forms a gel. An additional 147 g. of water is added, and the mixture is transferred to a blender. The polymer-water mixture is mixed for one minute in the blender, followed by 20 minutes of gentle mixing. The resulting opaque viscous polymer solution has a viscosity of 12.5 centipoises at 25° C. in a one weight percent aqueous solution.

Similar terpolymers are obtained when the polymerization is carried out in other inert polar solvents, such as methanol, ethanol, propanol, acetonitrile, ethylene glycol, propylene glycol, and the like.

The polymeric amine products of the present invention function well as flocculating agents on taconite tailings slurries, both on magnetite and hematite ores. The magnetite sample was obtained as a 10.5 percent by weight solids in aqueous solution sample, and diluted to 5.3 weight percent solids. The hematite ore was obtained in a dry form, ground in a ball mill, screened through a 325 mesh screen, and diluted with water to a one percent by weight solids slurry.

EXAMPLE 7

A 5.3 percent by weight aqueous slurry of magnetite-taconite tailings is placed in a series of cylindrical settling vessels and mixed individually with the various terpolymers as shown in Table I. Each terpolymer is added in the form of an aqueous 0.05 weight percent solution. The effect on settling rate exerted by the terpolymers is measured by recording the time required for the solid-liquid interface to settle 3 inches in the cylindrical settling vessel. The addition of the terpolymers is carried out in portions with mixing accomplished by repeated inversions of the settlng vessels. An untreated portion of the slurry is agitated similarly to serve as a check. All of the cylinders are brought to an upright position to initiate sedimentation, and the time required for the solid-liquid interface to settle 3 inches in the cylinder is measured. The results are expressed in Table I as settling rates in inches per minute.

TABLE I

| Terpol mer Flocculating Agent | Loading, Parts by wt. of Polymer per Million Parts Suspension | Magnetite Ore Settling Rate, Inches/ Minute |
|---|---|---|
| Blank | 0 | (1) |
| Example 1 | 1 | 4.8 |
|  | 2 | 5.2 |
|  | 5 | 6.4 |
| Example 2 | 1 | 5.0 |
|  | 2 | 5.0 |
|  | 5 | 5.7 |
| Example 3 | 1 | 4.8 |
|  | 2 | 5.3 |
|  | 5 | 6.1 |
| Example 4 | 1 | 1.1 |
|  | 2 | 2.1 |
|  | 5 | 3.1 |
| Example 5 | 1 | 2.8 |
|  | 2 | 3.2 |
|  | 5 | 4.5 |
| Example 6 | 1 | 2.4 |
|  | 2 | 2.7 |
|  | 5 | 3.7 |

[1] Not measurable.

EXAMPLE 8

The effect of the terpolymers on the clarity of magnetite and hematite ore solutions is evaluated by comparing the clarity of ore solutions treated with the terpolymers with the clarity of untreated solutions. The runs are carried ou using a Phipps and Bird six unit laboratory stirrer. One of the solutions is untreated; the other five are treated with the amounts of the terpolymers shown in Table II. The method consists of adding 500 ml. of the slurry to a 1000 mil. beaker and stirring for 10 minutes at 100 r.p.m. with the stirring unit. After stirring for 10 minutes, the slurry is allowed to settle for exactly 10 minutes and a 50 ml. sample is removed 1 inch below the surface of the solution. The suspended solids are determined gravimetrically and are reported on the basis of percent improvement over the blank as determined by the following equation:

Percent improvement over blank =

$$\left(\frac{\text{suspended solids} - \text{suspended solids in}}{\text{suspended solids in blank}} \text{flocculated sample}\right) \times 100$$

The results are shown in Table II.

TABLE II

| Terpolymer Flocculating Agent | Loading, Parts by wt. of Polymer per Million Parts Suspension | Clarity as percent Improvement Over Blank | |
|---|---|---|---|
| | | Magnetite Ore Slurry | Hematite Ore Slurry |
| Example 1 | 0.5 | | 99 |
| | 1 | 89 | |
| | 2 | 95 | |
| | 3 | 98 | |
| Example 2 | 0.5 | | 99 |
| | 1 | 86 | 99+ |
| | 2 | 97 | |
| | 3 | 98 | |
| Example 3 | 1 | 93 | 99+ |
| | 2 | 98 | 98 |
| | 3 | 99 | |
| Example 4 | 0.5 | | 91 |
| | 1 | 57 | 97 |
| | 2 | 74 | |
| | 3 | 85 | |
| Example 5 | 0.5 | | 96 |
| | 1 | 89 | 99+ |
| | 2 | 95 | |
| | 3 | 98 | |
| Example 6 | 1 | 76 | 99+ |
| | 2 | 91 | 98 |
| | 3 | 95 | |

What is claimed is:

1. A water-soluble terpolymer of random structure obtained by reacting by contacting, in an inert solvent, for a time sufficient to give a terpolymer having a viscosity between about 10 centipoises in a 10 weight percent solution in water at 25° C. and about 20 centipoises in a 1 weight percent water solution at 25° C., nine parts by weight of a first aziridine having the formula

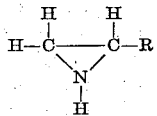

one to nine parts by weight of a second aziridine having the formula

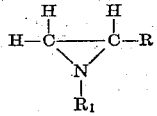

and 0.003 to 0.08 mole per mole of combined aziridines of a dihalo compound having the formula

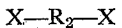

where each R independently is H or alkyl having up to four carbon atoms; $R_1$ has up to eight carbon atoms and is alkyl, allyl, aralkyl, cycloalkyl, hydroxyl-substituted alkyl, cyano-substituted alkyl, or ester-substituted ethyl; $R_2$ is alkylene having two to four carbon atoms, or 2-butenylene; and X is chlorine, bromine or iodine.

2. A terpolymer as defined in claim 1 wherein $R_1$ is alkyl or aralkyl; $R_2$ is ethylene and X is bromine or chlorine.

3. A terpolymer as defined in claim 1 wherein R is H; $R_1$ is phenethyl, allyl, 2-hydroxyethyl, n-butyl, 2-acetoxyethyl or 2-(ethoxycarbamoyl)ethyl; and $R_2$ is ethylene or 2-butenylene.

References Cited

UNITED STATES PATENTS

| 2,626,931 | 1/1953 | Bestian | 260—2 |
| 2,834,675 | 5/1958 | Jen et al. | 260—2 |
| 3,037,835 | 6/1962 | Bonvicini et al. | 8—55 |
| 3,134,740 | 5/1964 | Sheetz | 260—2 |
| 3,203,910 | 8/1965 | Wilson | 260—2 |

FOREIGN PATENTS 957,308  8/1949  France.

SAMUEL H. BLECH, Primary Examiner

U.S. Cl. X.R.

210—54; 260—29.2, 77.5, 88.3, 239